UNITED STATES PATENT OFFICE.

CHARLES S. ASH, OF SAN FRANCISCO, CALIFORNIA, ASSIGNOR TO GOULD & ASH, OF SAN FRANCISCO, CALIFORNIA, A COPARTNERSHIP CONSISTING OF CHAS. S. ASH AND RALPH A. GOULD.

PROCESS OF STABILIZING TEMPERANCE CEREAL BEVERAGES.

1,271,991.  Specification of Letters Patent.  Patented July 9, 1918.

No Drawing.  Application filed November 15, 1917. Serial No. 202,117.

*To all whom it may concern:*

Be it known that I, CHARLES S. ASH, a citizen of the United States, residing in the city and county of San Francisco and State of California, have invented new and useful Improvements in Processes of Stabilizing Temperance Cereal Beverages, of which the following is a specification.

This invention relates to a process of treating cereal beverages, and especially temperance beverages, containing less than 0.5% by volume of alcohol, known as "near-beer"; and has for its object to stabilize the beverage by eliminating the causes of cloudiness and turbidity therein, and also to prevent the development of color and the development of a "cooked taste" in the beverage following pasteurization.

In the manufacture of temperance beverages from cereal, or of cereal beverages containing less than 0.5% by volume of alcohol, substantially the same steps are followed as in manufacturing ordinary alcoholic beer, including fermentation, aging and pasteurization.

The chief object of the present process is to remove those nitrogenous substances which do not interfere with the clarity of the beverage when the same is kept at ordinary temperatures, but which do render the beverage turbid when it is stored in a keg and kept chilled, or after it is pasteurized and subsequently chilled to a low temperature. This result is obtained through the combined use of tannin and sulfurous acid, or its equivalent. The sulfurous acid in my process serves the double purpose of accelerating the action of the tannin in a manner similar to the action of a catalyzer and of acting as a paralytic on the enzyms which are concerned with the formation of the "cooked taste" and the discoloring acquired by pasteurization, which latter action is its main function. There is practically no bleaching effected by the sulfurous acid owing to the small quantity used. This is evidenced by the character of the precipitate produced by the process, which is dark colored, and contains coloring material initially held in solution in the untreated beverage.

Cereal beverages are rendered turbid or cloudy on standing, particularly in the cold, by reason of the precipitation of nitrogenous bodies. Another difficulty experienced in the manufacture and storage of cereal beverages is the imparting of a "cooked taste" to the beverage, as a result of pasteurization. Lagered "near-beer," or a cereal beverage containing less than 0.5% by volume of alcohol, like ordinary lagered beer, contains substances which are food for the various micro-organisms of fermentation and decomposition. The lagered beverage is susceptible to the action of micro-organisms of fermentation, consequently it is necessary, when the beverage is to be bottled to pasteurize it in order to render these organisms inert. The heat which is required to render these organisms inert is sufficient to impart a more or less pronounced "cooked taste" to the beverage in the bottle, which taste progressively increases by storage. Another result of the pasteurization of bottled cereal beverage, containing less than 0.5% by volume of alcohol, is the development of color in the beverage, the effect of which phenomenon also increases progressively by storage. These conditions are very undesirable and all bottlers of cereal beverages containing less than 0.5% by volume of alcohol are more or less troubled with them. Chill-proofing as now practised does not prevent the change in color or the acquisition of a "cooked taste" in bottled cereal beverages containing less than 0.5% by volume of alcohol.

By my process of eliminating the nitrogenous bodies, which cause cloudiness and turbidity, I prevent at the same time the development of a "cooked taste" and a darkening of the color in the beverage that is pasteurized, so that the bottled beverage is delivered from the bottle with as fresh and aromatic a taste and aroma and as light a color as the same beverage drawn from the keg.

Specifically my process consists in adding to the wort, to the fermented beverage, or to the de-alcoholized beverage at any time before it is filtered for bottling or packaging in kegs sufficient of a mixture of tannic acid, or any of its salts, and sulfurous acid gas or any salt of sulfurous acid, to produce the desired result.

The action of this mixture is both physical and chemical in character. The tannic acid combines with the slightly soluble nitrogenous bodies producing an insoluble compound which precipitates and in the course of its fall acts as a clarifying agent by carrying with it any suspended solids which are present. The subsequent filtering to which the beverage is subjected is bettered because of this collected tannic acid coagulum which acts as a filter mass. The sulfurous acid, or its salts, which is added with the tannic acid, serves a double purpose. It accelerates the chemical activity of the tannic acid and by its peculiar properties prevents the subsequent breaking down of the slightly stable compounds which are present in the beverage, the breaking down of which imparts a darker color and the cooked or pasteurized taste to bottled cereal beverages containing less than 0.5% by volume of alcohol.

In the practice of my process I can proceed at any stage of the brewing process after the mash has been transferred to the wort kettle. I prefer, however, to institute the necessary manipulations at the time the beverage is to be carbonated. This manipulation consists in adding to the Ruh beverage 35 to 60 milligrams per liter of tannic acid, and 25 to 50 milligrams per liter of sulfurous acid gas or its equivalent in the form of a salt of sulfurous acid; then agitating the mixture thoroughly and allowing it to stand until the desired chemical reaction and physical change have taken place, which, in practice, is about ten days. The chemical reaction which takes place produces a precipitate of the slightly soluble nitrogenous bodies which would be precipitated by any subsequent cooling or heating to which the beverage might be subjected. These precipitated nitrogenous bodies are deposited on the bottom of the tank in which the beverage is held and are subsequently removed by filtration when the beverage is sent to the filling rooms either to be put in kegs or bottles. My process, therefore, removes the nitrogenous bodies which give the trouble rather than treat them so they will remain in solution as present chill-proofing processes do.

The beverage is then carbonated and filtered.

With my process it is unnecessary to take any additional steps to accomplish perfect chill-proofing, or to prevent the acquisition of a cooked or pasteurized taste, or to prevent the development of color in beverage that is to be pasteurized. The treatment given stabilizes the beverage and accomplishes all three purposes.

My process stabilizes the beverage to such a degree that bottled cereal beverage containing less than 0.5% by volume of alcohol frozen solid and subsequently thawed out remains brilliant, retains its original color for a long period of time, and does not acquire a cooked or pasteurized taste.

Having thus described my invention, what I claim and desire to secure by Letters Patent is—

1. The process of stabilizing cereal beverages containing less than 0.5% by volume of alcohol, which consists in treating the beverage at any stage of the brewing process with tannin in the presence of sulfurous acid or its salts to precipitate those substances held in solution in the beverage which are susceptible to precipitation by cooling the finished beverage to temperatures below normal atmospheric temperatures and to prevent the breaking down under subsequent heat treatment of the slightly stable compounds in the beverage which cause it to acquire a cooked taste and to become discolored, and removing the precipitate.

2. The process of stabilizing cereal beverages containing less than 0.5% by volume of alcohol, which consists in treating the beverage at any stage of the brewing process after the primary fermentation has ceased with tannin in the presence of sulfurous acid or its salts to precipitate those substances held in solution in the beverage which are susceptible to precipitation by cooling the finished beverage to temperatures below normal atmospheric temperatures and to prevent the breaking down under subsequent heat treatment of the slightly stable compounds in the beer which cause it to acquire a cooked taste and to become discolored, and removing the precipitate.

3. The process of stabilizing cereal beverages containing less than 0.5% by volume of alcohol, which consists in treating the beverage with tannin in the presence of sulfurous acid or its salts to precipitate those substances held in solution in the beverage which are susceptible to precipitation by cooling the finished beverage to temperatures below normal atmospheric temperatures and to prevent the breaking down under subsequent heat treatment of the slightly stable compounds in the beverage which cause it to acquire a cooked taste and to become discolored, and removing the precipitate.

4. The process of stabilizing cereal beverages containing less than 0.5% of alcohol, which consists in treating the beverage at any stage of the process with from 20 to 60 milligrams per liter of tannin and from 15 to 50 milligrams of sulfurous acid, or its equivalent of salt of sulfurous acid, to precipitate those substances held in solution in the beverage which are susceptible to precipitation by cooling the finished beverage below normal atmospheric temperatures, and to prevent the breaking down under subsequent heat treatment of the slightly stable compounds in the beverage which cause it to acquire a cooked taste and to become discolored, and removing the precipitate.

In testimony whereof I have hereunto set my hand in the presence of two subscribing witnesses.

CHARLES S. ASH.

Witnesses:
J. M. BOUNDY,
BEN J. METZANHEIMER.